United States Patent
Driesen et al.

(10) Patent No.: US 8,250,135 B2
(45) Date of Patent: Aug. 21, 2012

(54) BROKERED CLOUD COMPUTING ARCHITECTURE

(75) Inventors: Volker Driesen, Walldorf (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 98 days.

(21) Appl. No.: 12/833,775

(22) Filed: Jul. 9, 2010

(65) Prior Publication Data

US 2012/0011190 A1  Jan. 12, 2012

(51) Int. Cl.
  *G06F 15/16* (2006.01)
(52) U.S. Cl. .................. 709/202; 709/201; 707/770
(58) Field of Classification Search .............. 709/202
  See application file for complete search history.

(56) References Cited

U.S. PATENT DOCUMENTS

| | | | |
|---|---|---|---|
| 2009/0265473 A1* | 10/2009 | Hydrie et al. | 709/229 |
| 2010/0131624 A1 | 5/2010 | Ferris | |
| 2010/0332401 A1* | 12/2010 | Prahlad et al. | 705/80 |
| 2011/0145094 A1* | 6/2011 | Dawson et al. | 705/26.63 |
| 2011/0295998 A1* | 12/2011 | Ferris et al. | 709/224 |

OTHER PUBLICATIONS

Extended European Search Report dated Dec. 23, 2011, for counterpart European patent application No. EP 11005608.2.

* cited by examiner

*Primary Examiner* — Wing F. Chan
*Assistant Examiner* — Andrew Woo
(74) *Attorney, Agent, or Firm* — Mintz, Levin, Cohn, Ferris, Glovsky and Popeo, P.C.

(57) ABSTRACT

A cloud broker receives a request for processing resources from one of a plurality of cloud management infrastructures (each of which correspond to one of a plurality of clouds). The cloud broker selectively enables access to the clouds associated with each cloud management infrastructure. The clouds each comprise segregated computing environments having at least one server for executing tasks and a data store for data persistency attached to the at least one server. The cloud management infrastructures selectively starts and stops services executed by the corresponding cloud. After receiving the request, the cloud broker identifies which of the plurality of clouds coupled to the cloud broker has processing capacity to fulfill the request. Subsequently, the cloud broker enables access to at least one of the identified clouds having capacity to fulfill the request. Related apparatus, systems, techniques and articles are also described.

18 Claims, 2 Drawing Sheets

BROKERED CLOUD COMPUTING ARCHITECTURE

TECHNICAL FIELD

The subject matter described herein relates to a brokered cloud computing architecture utilizing groups of clouds.

BACKGROUND

Customer-driven datacenters require sufficient computing power to handle a maximum throughput that might be required at any given time by customers. In some cases, datacenters offering "high availability" include additional resources as a precautionary measure (e.g., hardware to handle twice the anticipated capacity). In addition, typical datacenters reserve spare capacity in case there are hardware problems, maintenance is required, tests shall be performed or the application operation requires peak capacity for certain tasks (e.g., planning, quarterly financial closings, Christmas sales, etc.). Moreover, to avoid disaster scenarios, hardware is often replicated in different datacenters at different locations, such that one location can take over if the other location is hit by a disaster (floods, earthquakes, power outages, etc.).

Upon an introduction of new products or services requiring new hardware, maximum capacity requirements can increase dramatically which, in turn, requires an upgrade of the datacenter infrastructure. Such upgrades can be both costly result in a massive investment for companies.

SUMMARY

In one aspect, a cloud broker receives a request for processing resources from one of a plurality of cloud management infrastructures (each of which correspond to one of a plurality of clouds). The cloud broker selectively enables access to the clouds associated with each cloud management infrastructure. The clouds each comprise segregated computing environments having at least one server for executing tasks and a data store for data persistency attached to the at least one server. The cloud management infrastructures selectively starts and stops services executed by the corresponding cloud. After receiving the request, the cloud broker identifies which of the plurality of clouds coupled to the cloud broker has processing capacity to fulfill the request. Subsequently, the cloud broker enables access to at least one of the identified clouds having capacity to fulfill the request.

Each cloud management infrastructure can include data stored within a corresponding persistency (e.g., the data store, etc.) such that the requesting cloud management infrastructure performs tasks on the at least one identified cloud and replicates data stored in its persistency in the corresponding persistency of the at least one identified cloud.

The request can be initiated by one of the cloud management infrastructures. Such a scenario can occur, for example, when it is determined, by a first of the cloud management infrastructures, that its associated cloud does not have sufficient processing capacity. This can result in the first cloud management infrastructure transmitting the request to the cloud broker.

The request can specify certain parameters regarding the processing capacity (and the identification of the which cloud to use for such request can be based on such parameters). For example, it can specify hardware requirements such as a number of available central processing units (CPUs) for a cloud to fulfill the request. The request can specify certain hardware configurations (especially when there are multiple hardware configurations at any given time). The request can specify a geographic location and/or relative distance from a geographic point for a cloud to fulfill the request. The request can specify a period of time to fulfill the request (and such period of time may be immediate or it may be in the future). The request can specify a priority level for fulfilling the request such that higher priority level requests are handled prior to lower priority level requests (and, in some implementations, the higher priority level requests are invoiced at a higher rate).

The identification of which of the plurality of clouds has processing capacity can be based on reporting by the cloud management infrastructures prior to the request specifying available capacity (i.e., a "push" arrangement, etc.). Alternatively, the identification of the plurality of clouds having processing capacity can be based on a "pull" arrangement. For example, the cloud broker can poll each of the cloud management infrastructures to determine processing capacity levels in response to the request.

The cloud management infrastructure that made the request can consume processing resources on the at least one identified cloud. The request cloud management infrastructure can later send a notification to the cloud broker when such cloud management infrastructure ceases consumption of the processing resources of the at least one identified cloud. In addition or in the alternative, the cloud management infrastructure fulfilling the request, can send a report to the cloud broker when the corresponding cloud has freed capacity after the requesting cloud management infrastructure ceases consumption of the processing resources of the at least one identified cloud.

Enabling access to the at least one identified cloud can include designating, by a cloud management infrastructure corresponding to the at least one identified cloud, a portion of overall processing capacity in the corresponding cloud to the request to the requesting cloud management infrastructure.

The cloud broker can monitor processing capacity utilized by the requesting cloud management infrastructure and can invoice an account associated with the requesting cloud management infrastructure. The utilized processing capacity can be based on an amount of time corresponding servers in each cloud are made available and/or power consumed by such servers. The cloud broker can also monitor use of the at least one identified cloud by the requesting cloud management infrastructure to determine that required processing resources are at a level greater than an amount specified in the request are required. In such case, the cloud broker can enable additional access to the at least one identified cloud (and/or to other clouds) having capacity to fulfill the request at the greater level.

In another aspect, a cloud broker receives a request from one of a plurality of cloud management infrastructures for processing resources. The cloud broker selectively enables access to clouds associated with each cloud management infrastructure. The clouds each comprise segregated computing environments having at least one server for executing tasks and a data store for data persistency attached to the at least one server, the cloud management infrastructures selectively starting and stopping services executed by the corresponding cloud. Later, the cloud broker identifies which of the plurality of clouds coupled to the cloud broker has processing capacity to fulfill the request and meets pre-defined criteria (e.g., round robin rotation through clouds, SLAs, load balancing, etc.). Once this identification has been made, the cloud broker enables access to at least one of the identified clouds having capacity to fulfill the request and meeting the pre-defined criteria.

In yet a further aspect, a system includes a plurality of clouds and a primary computing system. The plurality of clouds each comprises segregated computing environments having at least one server for executing tasks and a data store for data persistency attached to the at least one server. Each cloud comprises (i.e., executes, etc.) a cloud management infrastructure that selectively can start and stop services executed by such cloud. The primary computing system comprises (i.e., executes, etc.) a cloud broker to monitor capacity for processing resources for each of the clouds and selectively enables access to clouds via the corresponding cloud management infrastructure. The cloud broker can store, in the primary computing system, overall capacity per cloud management infrastructure and can store which processing capacity is to be used at a certain period of time by each cloud.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. First, the current subject matter leverages hardware built and installed at distributed sites (e.g., customer sites, etc.) which is often underutilized or idle. Second, the current subject matter allows customers to reduce their IT capacity by avoiding the need for a dedicated datacenter (or multiple dedicated datacenters). Third, the ability to leverage the processing capacity of one or more geographically remote clouds helps minimize the risk with regard to disasters that are specific to a particular location.

Moreover, each operator of a private cloud can become a cloud provider for other companies. Such an arrangement can reduce costs because over-capacity can be "rented" to other companies. Using another companies cloud in a federation can often be less expensive for a company than using a professional cloud provider, because a company offering capacity desires to reduce their costs and does not necessarily need to make a large profit by providing a cloud and selling the capacity.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
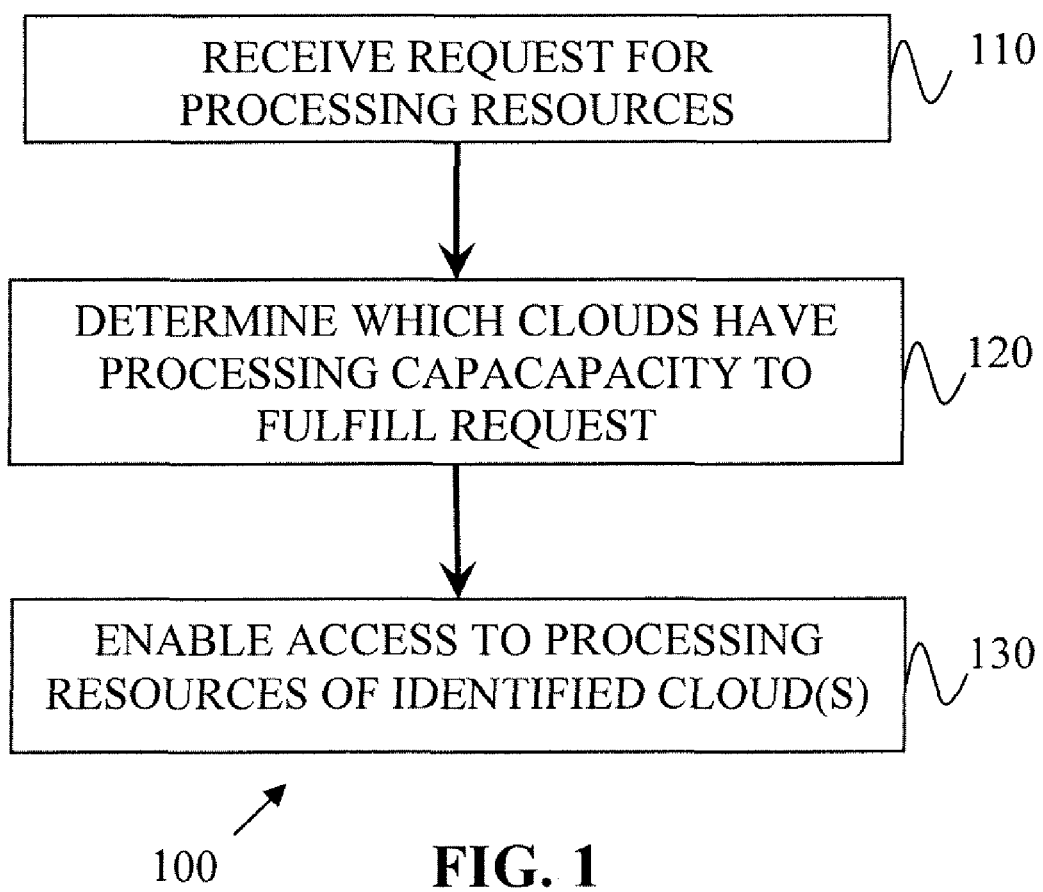
FIG. 1 is a process flow diagram illustrating selectively enabling access to processing resources of clouds by a cloud broker.

FIG. 1 is a processing flow diagram illustrating a method 100 in which, at 110, a request for processing resources is received by a cloud broker from one of a plurality of cloud management infrastructures. Each of the plurality of cloud management infrastructures corresponding to one of a plurality of clouds. The cloud broker selectively enables access to the clouds via the corresponding cloud management infrastructure. The clouds each comprise segregated computing environments having at least one server for executing tasks and a data store for data persistency attached to the at least one server. In addition, the cloud management infrastructures selectively start and stop services executed by the corresponding cloud. Thereafter, at 120, the cloud broker identifies which of the plurality of clouds coupled to the cloud broker has processing capacity to fulfill the request. Once this identification has been made, the cloud broker, at 130, enables access to at least one of the identified clouds having capacity to fulfill the request.

Figure 2:
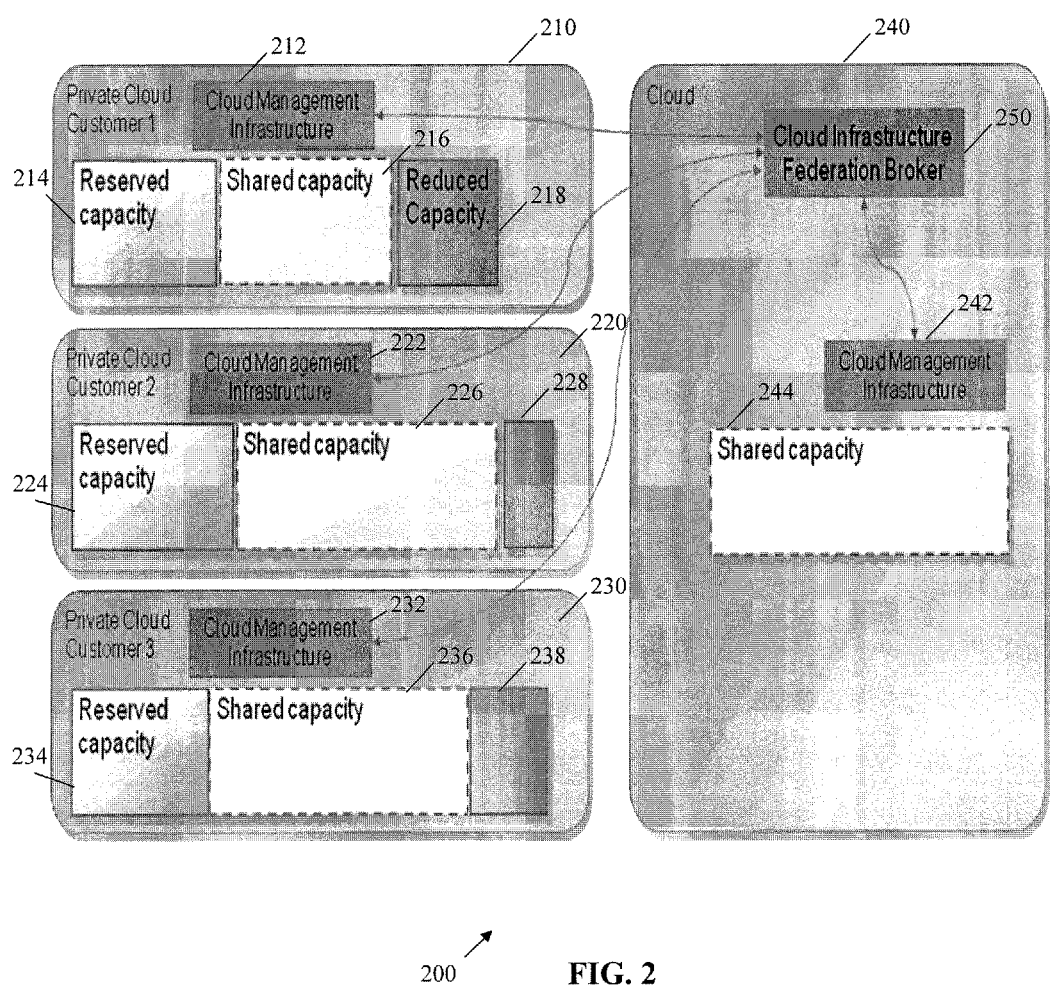
FIG. 2 is a system diagram illustrating a plurality of clouds having corresponding cloud management infrastructures that are coupled to a cloud infrastructure federation broker.

FIG. 2 is a functional block diagram 200 illustrating a plurality of customer clouds 210, 220, 230 and a central cloud 240. A cloud is a computing environment, having standardized servers and at least one data store for data persistency, which can be attached to each server. Each customer cloud 210, 220, 230 can include a cloud management infrastructure 212, 222, 232 that can start and stop services whose programs and data are stored on the shared persistency on one of the corresponding server as well as manage the attachment of persistency to such servers. As will be described below, the cloud management infrastructures 212, 222, 232 can assign capacity to a certain customers (e.g., computing systems, etc.) and record the capacity used for financial invoicing and the like. As will be discussed below, each customer cloud can have reserved capacity (i.e., available processing resources) 214, 224, 228, shared (or sharable) capacity 216, 228, 238, and reduced capacity 218, 228, 238.

The central cloud 240 includes a cloud infrastructure federation broker 250 (also referred to herein as simply a cloud broker) to manage communications amongst the clouds 210, 220, 230, 240 via the respective cloud management infrastructures 212, 222, 232, 242. The central cloud 240 is illustrated as also providing cloud services and also includes a cloud management infrastructure 242 and shared capacity 244. It will be appreciated that the cloud infrastructure federation broker 250 need not form part of a cloud and can be logically and/or physically separated from the central cloud 240 in certain implementations.

Resources can be shared among the customer clouds 210, 220, 230 especially in cases where each of the customer clouds use the same or similar physical infrastructure (e.g. Linux hardware, etc). With such an arrangement, the operators of the customer clouds 210, 220, 230 (i.e., the customers) are less concerned about resource intensive periods as the maximum capacity is distributed amongst all of the clouds 210, 220, 230, 240.

Each participating cloud management infrastructure 212, 222, 232, 242 can connect to the cloud infrastructure federation broker 250 and submit a request for processing resources (also referred to herein as capacity). For example, a first customer cloud management infrastructure 212 requests capacity from the cloud infrastructure federation broker 250. The cloud infrastructure federation broker 250 replies that both a second customer cloud 220 and a third customer cloud 230 have capacity (as the cloud infrastructure federation broker 250 knows the free capacity in each of the clouds 220, 230). The cloud infrastructure federation broker 250 can send a request to the second and third customer clouds 220, 230 for use of the shared capacity 226, 236. The cloud infrastructure federation broker 250 passes the address and connection information for the second and third customer clouds 220, 230 to the requesting cloud management infrastructure 212. Once remote capacity is available, the cloud management infrastructure 212 sends requests to the identified cloud management infrastructures 222, 232 instead of executing them on the local cloud 210.

A request for capacity can include a priority designation. For example, a high priority request can be invoiced at a higher rate, and as a result, such a request can be served with highest priority. This arrangement can support and/or enable customer specific service level agreements (SLAs).

A request for capacity can be enriched by a "geo distance". Such a request can define capacity that can be used at low latency (usually a cloud in a closer physical location to the requesting cloud management infrastructure) or capacity required for disaster safety (usually at a location physically remote from the requesting cloud management infrastructure). Such an arrangement enables the distribution of a request for a "disaster save" capacity, which is ensured to be on another location (in case two companies participate in the federated cloud, but share a datacenter and/or use the same service provider for their respective clouds). As an example: two customers are in Los Angeles while another is in San Diego. Both customers in Los Angeles have their hardware in the same IT center. A request for a "disaster safe" cloud would give a customer in Los Angeles capacity of the customer in San Diego, not of the other customer in Los Angeles. Geo-distance restrictions can be identified on an actual or relative basis. For example, geo coordinates: 49.03 E, 8.03 N for an absolute position or a difference of x° or x km for a relative basis.

The cloud management infrastructures 212, 222, 232 using remote capacity can identify when demand for the remote capacity is over. At such point, the corresponding cloud management infrastructure 212, 222, 232 stops services on its shared capacity 216, 226, 236, after that, the capacity can be given back to the cloud management infrastructure (i.e., allocated as reserved capacity 214, 224, 234). The cloud management infrastructure 212, 222, 232 receiving back capacity from the consuming cloud management infrastructure 212, 222, 232 reports the freed capacity to the cloud federation broker 250.

The cloud infrastructure federation broker 250 can monitor capacity on each cloud 210, 220, 230 via either a push relationship in which each corresponding cloud management infrastructure 212, 222, 232 identifies when capacity is available and/or an amount of available capacity or a pull relationship in which the cloud infrastructure management broker 250 polls the clouds 210, 220, 230 to determine available capacity. In the latter arrangement, the cloud infrastructure federation broker 250 can connect to each participating cloud management infrastructure 212, 222, 232 and submit a request. The request can ask for currently free capacity. This enables the cloud infrastructure federation broker 250 to monitor the capacity and upon a request for capacity can identify which cloud 210, 220, 230 has the required capacity and assign it to handle the corresponding tasks. At such point, with reference to the first customer cloud 210, at least a portion of the reduced capacity 218 can be consumed/characterized as shared capacity 216.

The cloud management infrastructures 212, 222, 232 can report total capacity and the currently free capacity. As an example, there are 10 L and 90 S servers in the cloud, 6 L and 50 S servers are used. The cloud management infrastructures 212, 222, 232 can also report the history of capacity usage, usage patterns and usage forecasts for a certain period in the future, and the like.

Request for capacity can include information such as how much capacity is required, when the capacity is first required, and over what time period the capacity is required (i.e., time frame information). For example, time periods can be requested in advance for events such as an end of quarter or a planning period where typically capacity is required. In cases where capacity is required for a larger amount and/or longer than initially planned (which may be defined in the request), services can be terminated and/or increased fees can be applied. A sample request for capacity can specify the capacity in terms of server categories (# CPU, # GB RAM, disk storage), and storage. As an example: the clouds 210, 220, 230 offer hardware in categories S (2CPU, 4 GB RAM, 100 GB disk), M (4CPU, 16 GB RAM, 500 GB disk) and L (16CPU, 128 GB RAM, 5 TB disk), upon a request, the infrastructure request 1*L and 10*S. This arrangement allows in addition to a capacity allocation, tracking capacity usage so that such use be included in the cost model.

The reserved capacity 214, 224, 234 can be reserved solely for the corresponding cloud management infrastructure 212, 222, 232 or it can be reserved by the cloud infrastructure federation broker 250 or one of the other cloud management infrastructures 212, 222, 232, 242. For example, reserved capacity 214, 224, 234 costs x Euro/day and, in addition, use of capacity costs y Euro/hour. This arrangement allows also for invoicing for both reserving capacity and the use of capacity.

The cloud infrastructure federation broker 250 can store information such as the overall capacity available per cloud management infrastructure 212, 222, 232 and stores, which capacity is planned to be used at a certain period of time. This enables defining models to request capacity for a time period and monitor the "give back capacity in time". SLA can be defined and tracked. Giving back capacity early can be rewarded, giving capacity back late can be charged additionally. This allows computing, the capacity a customer shared/provided to others and the capacity used from other customers. This can be the basis for a financial balancing (i.e., credit/debit based on sharing of internal capacity vs. use of external capacity, etc.).

The cloud management infrastructures 212, 222, 232, 242 are set up to allows calling of another cloud management infrastructure remotely in order to perform certain tasks and to replicate data stored within the persistency of one cloud to another. Typically, WAN traffic is slower than LAN. The WAN can be bypassed, by copying the required stored data to the disk storage in the other cloud. Alternatively, a wide area network accelerator can be utilized.

Usage metrics can be based on several factors. For example, it can be based on whether a server is up or active, or it can be based on measured processing resource consumption. As an example, server L had been assigned for 8 weeks to another customer, but only ran 7 weeks and 6 h, the rest of the time it had been down (and so the charges would be based on the time period of actual use).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
   receiving, by a cloud broker from one of a plurality of cloud management infrastructures, a request for processing resources, each of the plurality of cloud management infrastructures corresponding to one of a plurality of clouds, the cloud broker selectively enabling access to the plurality of clouds, the clouds each comprising segregated computing environments having at least one server for executing tasks and a data store for data persistency attached to the at least one server, the cloud management infrastructures selectively starting and stopping services executed by the corresponding cloud;
   identifying, by the cloud broker, which of the plurality of clouds coupled to the cloud broker has processing capacity to fulfill the request;
   enabling, by the cloud broker, direct access by the requesting cloud management infrastructure to at least one of the identified clouds having capacity to fulfill the request;
   monitoring, by the cloud broker, use of the at least one identified cloud by the cloud management infrastructure that made the request to determine that processing resources necessary to fulfill the request are at a level greater than an amount specified in the request; and
   enabling, by the cloud broker, access by the requesting cloud management infrastructure to the at least one other identified cloud having capacity to at least partially fulfill the request.

2. A method as in claim 1, wherein the identification by the cloud broker is further based on which of the plurality of clouds coupled to the cloud broker meet pre-defined eligibility criteria.

3. A method as in claim 1, further comprising:
   determining, by a first of the cloud management infrastructures, that its associated cloud does not have sufficient processing capacity; and
   generating and transmitting, by the first cloud management infrastructure to the cloud broker, the request.

4. A method as in claim 1, wherein the request specifies a number of available central processing units (CPUs) for a cloud to fulfill the request and/or the request specifies one of a plurality of available cloud hardware configurations to fulfill the request.

5. A method as in claim 1, wherein the request specifies a geographic location and/or relative distance from a geographic point for a cloud to fulfill the request.

6. A method as in claim 1, wherein the request specifies a period of time to fulfill the request.

7. A method as in claim 1, wherein the request specifies a priority level for fulfilling the request.

8. A method as in claim 1, wherein the identification of which of the plurality of clouds has processing capacity is based on reporting by the cloud management infrastructures prior to the request specifying available capacity.

9. A method as in claim 1, further comprising: polling, by the cloud broker, each of the cloud management infrastructures, to determine processing capacity levels in response to the request; and
   wherein the identification of which of the plurality of clouds has processing capability is based on the polling.

10. A method as in claim 1, further comprising:
    consuming, by the cloud management infrastructure that made the request, processing resources on the at least one identified cloud; and
    sending, by the cloud management infrastructure that made the request, a notification to the cloud broker when the cloud management infrastructure that made the request ceases consumption of the processing resources of the at least one identified cloud.

11. A method as in claim 1, further comprising:
    sending, by the cloud management infrastructure fulfilling the request, a report to the cloud broker when the corresponding cloud has freed capacity after the cloud management infrastructure that made the request ceases consumption of the processing resources of the at least one identified cloud.

12. A method as in claim 1, wherein enabling access to the at least one identified cloud comprises:
    designating, by a cloud management infrastructure corresponding to the at least one identified cloud, a portion of overall processing capacity in the corresponding cloud to the request to the cloud management infrastructure that made the request.

13. A method as in claim 1, wherein the cloud broker monitors processing capacity utilized by the cloud management infrastructure that made the request and invoices an account associated with the cloud management infrastructure that made the request.

14. A method as in claim 13, wherein the utilized processing capacity is based on an amount of time corresponding servers in each cloud are made available and/or power consumed by such servers.

15. A method as in claim 1, wherein each cloud management infrastructure includes data stored within a corresponding persistency, and wherein the cloud management infrastructure that made the request performs tasks on the at least one identified cloud and replicates data stored in its persistency in the corresponding persistency of the at least one identified cloud.

16. A method as in claim 1, wherein the request is to reserve processing capacity for a pre-defined time period.

17. An article of manufacture comprising:
computer executable instructions stored on a non-transitory computer readable media, which, when executed by a computer, causes the computer to perform operations comprising:
receiving, by a cloud broker, a request for processing resources, the cloud broker selectively enabling access to clouds, the clouds each having an associated cloud management infrastructure and comprising segregated computing environments having at least one server for executing tasks and a data store for data persistency attached to the at least one server, the cloud management infrastructures selectively starting and stopping services executed by the corresponding cloud;
identifying, by the cloud broker, which of the plurality of clouds coupled to the cloud broker has processing capacity to fulfill the request and meets pre-defined criteria; and
enabling, by the cloud broker, direct access by the requesting cloud management infrastructure to at least one of the identified clouds having capacity to fulfill the request and meeting the pre-defined criteria.

18. A method comprising:
receiving, by a cloud broker from one of a plurality of cloud management infrastructures, a request for processing resources, each of the plurality of cloud management infrastructures corresponding to one of a plurality of clouds, the cloud broker selectively enabling access to the plurality of clouds, the clouds each comprising segregated computing environments having at least one server for executing tasks and a data store for data persistency attached to the at least one server, the cloud management infrastructures selectively starting and stopping services executed by the corresponding cloud, the request specifying processing resources outside of a pre-determined geographic zone;
identifying, by the cloud broker, which of the plurality of clouds coupled to the cloud broker has processing capacity to fulfill the request;
enabling, by the cloud broker, direct access by the requesting cloud management infrastructure to at least one of the identified clouds having capacity to fulfill the request;
monitoring, by the cloud broker, use of the at least one identified cloud by the cloud management infrastructure that made the request to determine that processing resources necessary to fulfill the request are at a level greater than an amount specified in the request; and
enabling, by the cloud broker, access by the requesting cloud management infrastructure to the at least one other identified cloud having capacity to at least partially fulfill the request.

* * * * *